United States Patent [19]

Rossi et al.

[11] Patent Number: 5,668,703
[45] Date of Patent: Sep. 16, 1997

[54] BOOST CONVERTER FOR DRIVING A CAPACITIVE LOAD

[75] Inventors: Domenico Rossi, Cilavegna, Italy; Kazuyuki Tanaka, Yokohama, Japan

[73] Assignee: SGS-Thomson Microelectronics S.r.l., Agrate Brianza, Italy

[21] Appl. No.: 346,139

[22] Filed: Nov. 29, 1994

[30] Foreign Application Priority Data

Nov. 29, 1993 [EP] European Pat. Off. .............. 93830472

[51] Int. Cl.⁶ .................................................. H02M 3/335
[52] U.S. Cl. ........................... 363/16; 323/222; 323/282; 363/24
[58] Field of Search ................................. 323/222, 224, 323/225, 282; 363/22, 24, 127, 16

[56] References Cited

U.S. PATENT DOCUMENTS

| | | | |
|---|---|---|---|
| 4,085,358 | 4/1978 | Holcomb | 363/16 X |
| 4,736,151 | 4/1988 | Dishner | 323/224 |
| 4,814,685 | 3/1989 | Renger | 323/224 |
| 5,196,995 | 3/1993 | Gulczynski | 323/225 X |

FOREIGN PATENT DOCUMENTS

WO-A-91 17537  11/1991  WIPO .

*Primary Examiner*—Peter S. Wong
*Assistant Examiner*—Y. J. Han
*Attorney, Agent, or Firm*—David V. Carlson; Seed and Berry LLP

[57] ABSTRACT

A DC—DC boost converter for directly driving a capacitive load employs four switches for cyclically commuting the connection configuration of an energy storing inductor. First and second switches are driven at a relatively high frequency and provide an impulsive charge path of the inductor by connecting one or the other end to a power supply rail. Third and fourth switches are driven in phase opposition to each other at a relatively low frequency and provide a discharge path from one and the other end of the inductor, respectively, toward an output node of the circuit to which the capacitive load is connected.

34 Claims, 2 Drawing Sheets

BOOST CONVERTER FOR DRIVING A CAPACITIVE LOAD

CROSS-REFERENCE TO RELATED APPLICATION

This application claims priority from Italian app'n 93830472.2, filed Nov. 29, 1993, which is hereby incorporated by reference.

BACKGROUND AND SUMMARY OF THE INVENTION

The present invention relates to an improved boost converter, particularly suited for directly driving a capacitive load at a relatively high voltage. The circuit is particularly suited for integration, being capable of delivering a voltage that is substantially twice the intrinsic breakdown voltage of the integrated structures that would compose the circuit.

The necessity of driving or powering components such as electroluminescent diode displays (EL LAMPS) and more in general low power actuators or indicators functioning at relatively high voltage, for example at voltages comprised between 60 V and 120 V, is often encountered in electronic apparatuses.

Reduction of energy consumption is an attendant requisite that becomes of fundamental importance in battery operated portable apparatuses, for example electronic watches, pocket calculators, computers, etc.

The use of voltage multipliers for generating high voltages, starting from particularly low supply voltages, for example 1.2 V battery voltage, is practically impossible because of a progressive increase of losses with the number of stages. In these cases, DC—DC converter circuits commonly referred to as boost converters, are employed.

A boost converter is functionally constituted by an energy storing inductor, connected to the supply and momentarily driven toward ground by a switch, during a charging phase. The energy stored in the inductor is then discharged during a successive discharge phase through a diode to an output capacitor, across the terminals of which an incrementally increased voltage may be developed in function of the number of cycles of discharge of the reactive energy stored in the inductor. Normally a boost converter is completed by a control circuit that regulates the voltage developed across the charge storing capacitor by appropriately driving the switch. The charge capacitor or capacitors provide a high voltage supply to user circuits or to components that normally require a high voltage.

In case of components that may be driven at a high voltage and which may be electrically assumed to be equivalent to a capacitance having a more less high loss-factor, as for example electroluminescent diodes, it is a common practice to directly drive the load element with the converter circuit, by inverting, by the use of pairs of switches, driven in phase opposition by complementary driving signals at a relatively low frequency, the connections of the two terminals of the load (that may be considered as a capacitor) to the cathode of the discharging diode of the inductor and ground.

As an example, such a direct driving circuit for an electroluminescent diode is disclosed in U.S. Pat. No. 4,527,096. By fixing the number of switching pulses that are fed to the control terminal of the switch that is used to charge the inductor, during a phase of configuration of the connections of the electroluminescent diode, it is possible to predefine the maximum peak-to-peak voltage that is applied to the capacitive load at the end of each configuration phase. In practice, a succession of stepped ramps of voltage of alternating sign are applied to the load. (The load device would preferably include an internal switching or diode network, in order to make use of both the high voltage and low voltage peaks provided.)

The converter is capable of providing a high voltage boost ratio with small energy losses and therefore with a high deficiency, an aspect of fundamental importance in battery powered applications.

Such a DC—DC boost converter circuit may be realized by employing discrete components and/or employing electromechanical relays for implementing the switches necessary for cyclically inverting the load connections. Alternatively, the converter circuit may be realized in the form of an integrated circuit, by employing electronic switches in the form of bipolar or field effect transistors with obvious advantages in miniaturization capabilities.

This possibility is disclosed in U.S. Pat. No. 4,527,096, wherein it is remarked the need of implementing the integrated circuit with a fabrication process for high voltage devices, in view of the fact that the relative integrated structures must be capable of withstanding a reverse voltage equal to the maximum-to-peak voltage that is generated by the boost converter across the capacitive load. In other words, the integrated circuit must have breakdown characteristics that are sufficiently higher than the value of the maximum peak-to-peak voltage produced by the circuit.

It is known that the architecture of integrated circuits may be adapted for achieving particularly high breakdown voltages as imposed by design needs, and which in the specific case of a boost converter circuit that can be used for directly driving a capacitive load, as the one represented by an electroluminescent diode, may reach exceptionally high values. This requirement, though not precluding the possibility of realizing the boost converter in the form of a monolithically integrated circuit, imposes the realization of sufficiently sturdy integrated structures for withstanding a reverse voltage that may reach up to about 120 V. This imposes adequate sizes, thicknesses, depth of junctions and/or the implementation of particular structures and arrangements suitable to increase the breakdown voltages. In general these requisites determine limits to the miniaturization of the integrated circuit itself, which normally contains the whole functional circuit of the apparatus, beside the boost converter for driving an external load.

Therefore there exists a need or utility for a boost converter, suitable for directly driving at a relatively high voltage a capacitive load, having a simplified circuit and which at the same time is readily integratable and, in such a monolithically integrated form, also permits a marked miniaturization of the whole integrated circuit.

The boost converter circuit for driving a capacitive load object of the present invention employs four switches for delivering across the terminals of a capacitive load, an alternating sequence of positive and negative voltage ramps, at a first control frequency. Each voltage ramp is produced through a certain number of charge and discharge of an inductor on the capacitive load, at a second switching frequency.

A control circuit generates the control signals at said first control frequency and at said second switching frequency. The first control frequency may be in the order of 20–100 hertz (Hz), while the second switching frequency may be in the order of kilohertz (kHz).

In practice, each terminal of the inductor is connected to a charging switch and to a discharge path that comprises a switch and a diode in electrical series with each other, connected between the terminal of the inductor and the output node. The two discharge paths are alternately enabled by a pair of complementary signals at said first frequency, which close one or the other of the two switches that enable the respective discharge path toward the output node to which an external capacitive load is connected.

Coherently, a charging switch of the inductor is driven to switch at a relatively high frequency (said second switching frequency) while another charging switch remains open during the entire semiperiod. During the following semiperiod, the circuit configuration is reversed, so as to produce a ramp of opposite polarity to the preceding ramp.

The voltage ramps that are produced have a high frequency ripple, corresponding to the switching frequency of the respective charging switch of the inductor.

It should also be noted that the disclosed circuit configuration is novel aside from the timing considerations discussed (i.e. the operation of switches A and B at a much higher peak frequency than the frequency of operation of switches C and D).

BRIEF DESCRIPTION OF THE DRAWING

The disclosed inventions will be described with reference to the accompanying drawings, which show important sample embodiments of the invention and which are incorporated in the specification hereof by reference, wherein.

The different aspects and advantages of the circuit of the invention will be more evident through the following description of an important embodiment and by referring to the attached drawings, wherein.

DETAILED DESCRIPTION OF THE PREFERRED EMBODIMENTS

Figure 1:
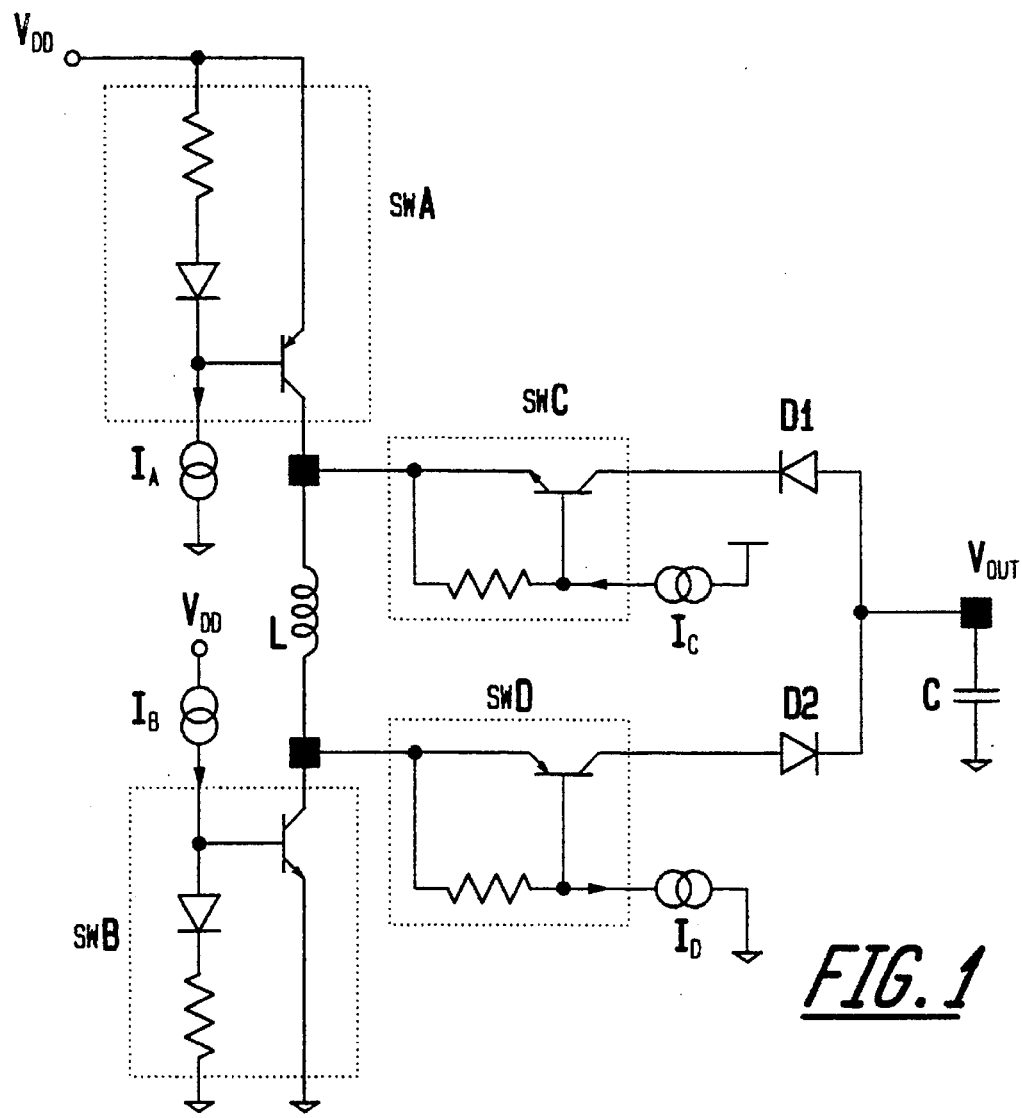
FIG. 1 is a circuit diagram of a boost converter of the invention.

The numerous innovative teachings of the present application will be described with particular reference to the presently preferred embodiment (by way of example, and not of limitation), in which:

With reference to FIG. 1, the L inductor is connectable through the charge switches SWA and SWB, respectively to the supply rail $V_{DD}$ and ground. Moreover, each of the two terminals of the inductor L may be alternately connected to the output node VOUT, through use of the two distinct paths SWC-D1 and SWD-D2.

The driving of the switches SWA, SWB, SWC, SWD, may be implemented by suitable generators of control circuits IA, IB, IC and ID.

Figure 2:
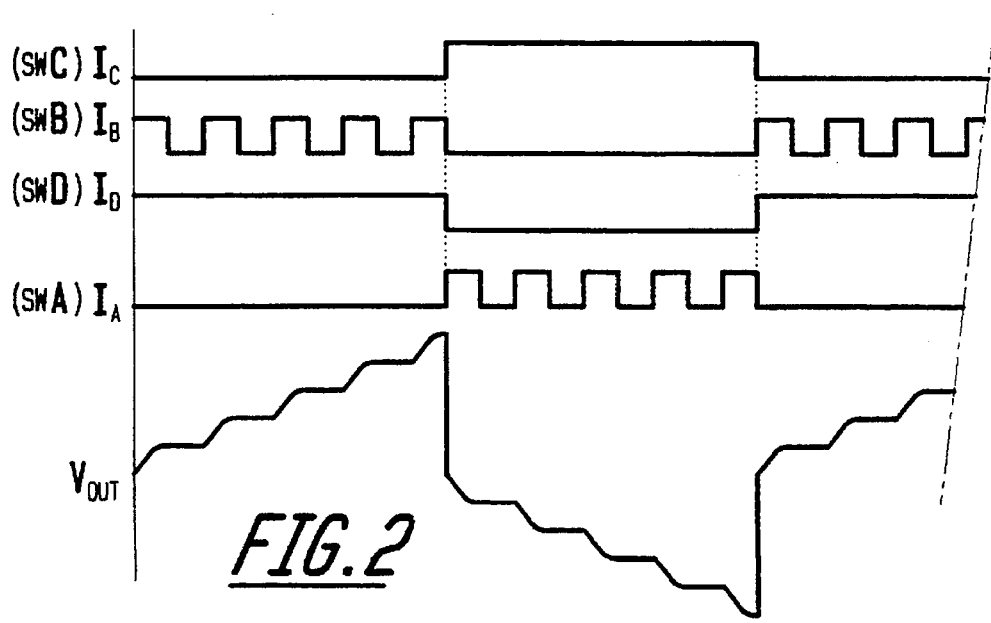
FIG. 2 is a timing diagram of the circuit of FIG. 1.

By supposing, conventionally, that to a high logic value of the respective control signal corresponds a state of closing of the relative switch, the control signals of the circuit are shown in FIG. 2.

Of course, the control signals may be generated by a suitable control circuit (not shown in the figure), which may produce the complementary pair of low frequency signals IC and ID, as well as the high frequency switching signals IA and IB that drive the charge switches SWA and SWB, by deriving them from a system clock signal, by the use of frequency dividing circuits.

Figure 3:
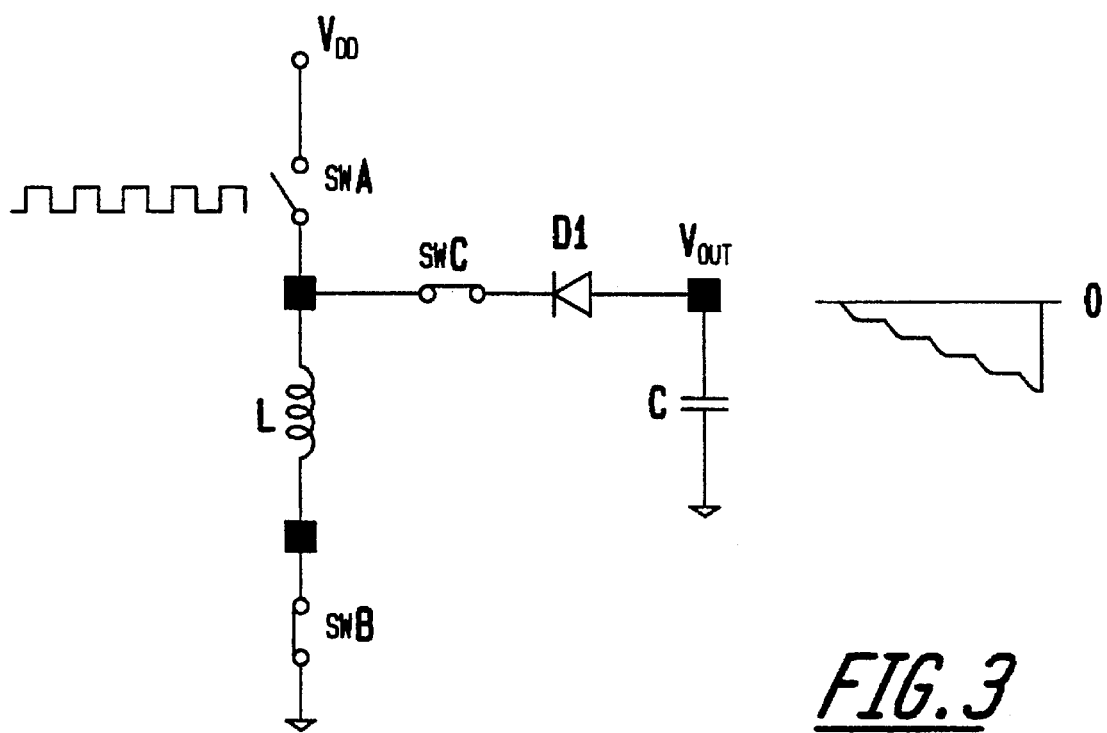
FIG. 3 shows the functional configuration of the circuit during a phase of production of a negative voltage ramp across a capacitive load.
Figure 4:
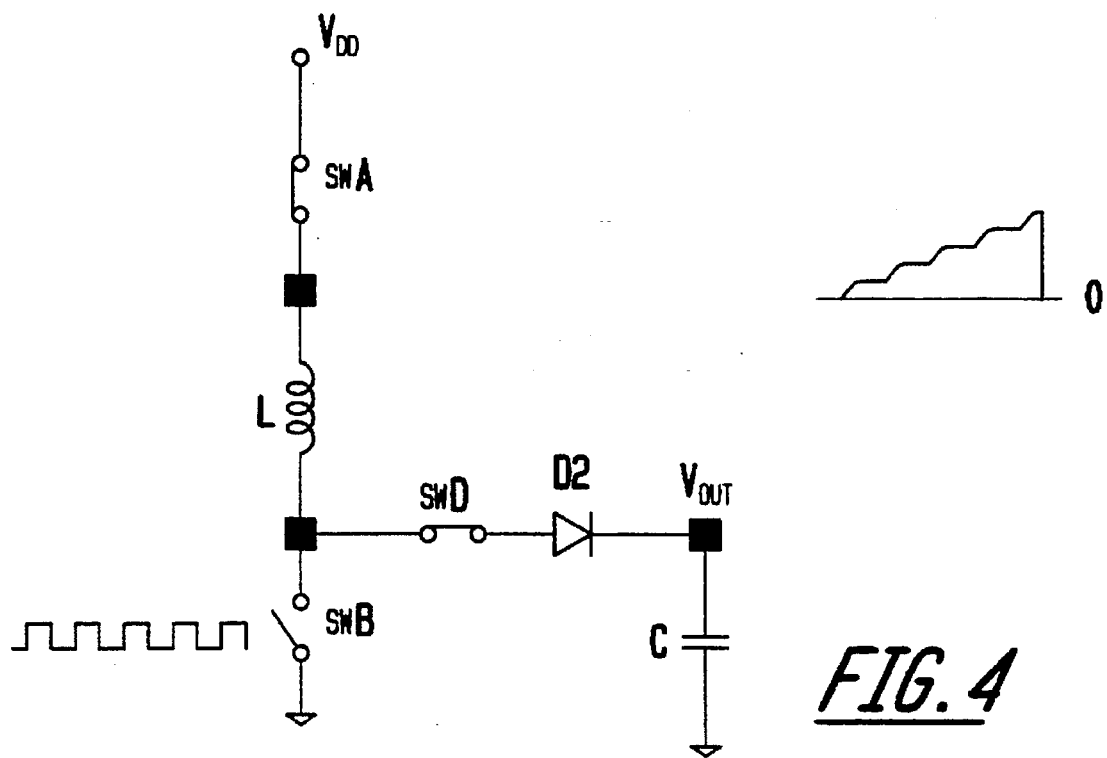
FIG. 4 shows the functional configuration of the circuit during a phase of production of a positive voltage ramp across the load.

Operatively, during a phase (semiperiod) of the control signals IC and ID, the functional circuit will be configured as depicted in FIG. 3 and across the load C a negative voltage ramp will develop, as shown. During a subsequent phase (semiperiod), the functional circuit will be configured as depicted in FIG. 4, and a positive voltage ramp will develop across the load C.

The whole circuit, with the exception of the storing inductor L and obviously of the external load C, can be integrated. Although the structure of the four switches SWA, SWB, SWC and SWD has been shown as composed substantially by a bipolar type transistor, it may be realized also by employing a field effect transistor, for example by employing integrated CMOS structures.

Of course, as will be evident to those of ordinary skill in the art, the node VOUT of the circuit will be subject to a negative voltages. In practice, in an integrated circuit designed for a single supply, for example for a positive supply, the node VOUT will be subject to a so-called "below ground voltage", therefore the integrated structures that are directly connected to the output node VOUT, in particular the diodes D1 and D2, must be realized so as to withstand a certain negative voltage, as referred to the ground potential (substrate) of the integrated circuit.

This may be easily obtained by employing for both D1 and D2, an integrated structure commonly known as a low leakage diode (LLD), which may be readily realized also in a basic CMOS fabrication process, as described in the Italian patent No. 1,188,609, of the same Applicant.

According to a disclosed class of innovative embodiments, there is provided a two-way boost converter circuit, for operation from first ($V_{DD}$) and second (ground) power supply connections. The circuit comprises an inductor L, operatively connected between the first and second power supplies to pass current in a first direction from $V_{DD}$ to ground. A first switch SWA is connected in series between the inductor L and the first power supply connection $V_{DD}$. A second switch SWB is connected in series between the inductor L and the second power supply connection (ground). A third switch SWC is operatively connected to a first terminal (upper terminal) of the inductor L, and a fourth switch SWD is operatively connected to a second terminal (lower terminal) of the inductor L. A first diode D1 is operatively connected between the third switch SWC and an output terminal $V_{OUT}$, and a second diode D2 is operatively connected between the fourth switch SWD and an output terminal $V_{OUT}$. The first D1 and second D2 diodes are connected to the output terminal $V_{OUT}$ with opposite respective orientations as shown in FIG. 1.

According to another disclosed class of innovative embodiments, there is provided: A two-way boost converter circuit, for operation from first ($V_{DD}$) and second (ground) power supply connections, comprising: an inductor L; a first switching circuit SWA operatively connected to source current from the first power supply connection $V_{DD}$ to a first terminal (upper terminal) of the inductor L; a second switching circuit SWB operatively connected to sink current from a second terminal (lower terminal) of the inductor L to the second power supply connection (ground); a third switching circuit SWC operatively connected to source current from an output connection $V_{OUT}$ to the first terminal (upper terminal) of the inductor L as shown in FIG. 3; and a fourth switching circuit SWD operatively connected to sink current from the second terminal (lower terminal) of the inductor L to the output terminal $V_{OUT}$ as shown in FIG. 4; whereby first, second, third, and fourth switching circuits SWA–SWD can be operated to pump the voltage at the output terminal $V_{OUT}$ either upwardly or downwardly as shown in FIG. 2, while maintaining a single direction of current flow from $V_{DD}$ to ground through the inductor L.

According to another disclosed class of innovative embodiments, there is provided: A two-way boost converter circuit, for operation from first $V_{DD}$ and second ground power supply voltage connections, comprising: first means (closed switches SWB and SWC, and intermittently closing switch SWA as shown in FIG. 3) for driving current through an inductor L in a first direction from $V_{DD}$ to ground, and for chopping the current supplied to the inductor L by opening the switch SWA to provide a boosted output current of first polarity (negative in FIG. 3) at an output terminal $V_{OUT}$; and second means (closed switches SWA and SWD, and intermittently closing switch SWB as shown in FIG. 4) for driving and chopping current through the inductor in the first direction, and for chopping the current supplied to the inductor L by opening the switch SWB to provide a boosted output current of a second polarity (positive in FIG. 4) at the output terminal $V_{OUT}$; the first and second means operating alternately, with a frequency of alternation (frequency of $I_C$ and $I_D$ as shown in FIG. 2) which is much less than the frequency of the chopping (as shown by the frequency of the first semiperiod of $I_B$).

According to another disclosed class of innovative embodiments, there is provided: A two-way boost converter circuit, for operation from first $V_{DD}$ and second ground power supply connections, comprising: first (upper terminal connected to SWA) and second (lower terminal connected to SWB) terminals for connection to an external inductor L; a first switch SWA connected in series between the first terminal (upper terminal) and the first power supply connection $V_{DD}$; a second switch SWB connected in series between the second terminal (lower terminal) and the second power supply connection (ground); a third switch SWC, operatively connected to the first terminal (upper terminal), and a fourth switch SWD operatively connected to the second terminal (lower terminal); a first diode D1 operatively connected between the third switch SWC and an output terminal $V_{OUT}$, and a second diode D2 operatively connected between the fourth switch SWD and an output terminal $V_{OUT}$; wherein first and second diodes D1 and D2 are connected to the output terminal $V_{OUT}$ with opposite respective orientations.

According to another disclosed class of innovative embodiments, there is provided: An integrated two-way boost converter circuit, for operation from first $V_{DD}$ and second (ground) power supply connections, comprising: first (upper terminal connected to SWA) and second (lower terminal connected to SWB) terminals for connection to an external inductor L; a first switching circuit SWA operatively connected to source current from the first power supply connection $V_{DD}$ to a first terminal (upper terminal) of the inductor L; a second switching circuit SWB operatively connected to sink current from a second terminal (lower terminal) of the inductor L to the second power supply connection (ground); a third switching circuit SWC operatively connected to source current from an output connection $V_{OUT}$ to the first terminal (upper terminal) of the inductor L; and a fourth switching circuit SWD operatively connected to sink current from the second terminal (lower terminal) of the inductor L to the output terminal $V_{OUT}$; whereby first, second, third, and fourth switching circuits SWA–SWD can be operated to pump the voltage at the output terminal $V_{OUT}$ either upwardly (as shown by the first semiperiod in FIG. 2) or downwardly (as shown by the second semiperiod in FIG. 2), while maintaining a single direction of current flow from $V_{DD}$ to ground through the inductor L.

According to another disclosed class of innovative embodiments, there is provided: A method for generating a bipolar boosted power supply, comprising the steps of: a) as shown in FIG. 3, driving current through an inductor L in a first direction from $V_{DD}$ to ground, and chopping current supplied to the inductor L while taking a boosted output current of a first polarity (negative in FIG. 3) from a first terminal (upper terminal) of the inductor L, and connecting the first terminal (upper terminal) of the inductor L to provide the boosted current of the first polarity as an output $V_{OUT}$; b) driving current through an inductor L in the first direction, and chopping current supplied to the inductor L while taking a boosted output current of a second polarity (positive in FIG. 4) from a second terminal (lower terminal) of the inductor L, and connecting the second terminal of the inductor to provide the boosted current of the second polarity as an output $V_{OUT}$; and c) alternating steps a) and b), at a frequency (frequency of $I_C$ and $I_D$ as shown in FIG. 2) which is much lower than the frequency of the chopping (as shown by the frequency of the first semiperiod of $I_B$).

According to another disclosed class of innovative embodiments, there is provided: A DC—DC boost converter for directly driving a capacitive load C, comprising an energy storing inductor L, at least a charge switch of the inductor, at least a discharge switch of the inductor toward an output node $V_{OUT}$ connected to a terminal of the capacitive load C, having a second terminal connected to ground, characterized by comprising: a first switch SWA connected between a first terminal (upper terminal) of the inductor L and a supply rail $V_{DD}$; a second switch SWB connected between the inductor L and ground; a first discharge path between the first terminal (upper terminal) of the inductor L and the output node $V_{OUT}$ comprising a first diode D1 and a third switch SWC, functionally connected in series; a second discharge path between the second terminal (lower terminal) of the inductor L and the output node $V_{OUT}$, comprising a second diode D2 and a fourth switch SWD, functionally connected in series; the third and fourth switches SWC and SWD being driven in phase opposition $I_C$ and $I_D$ at a first control frequency (frequency of $I_C$ or $I_D$) and the first and second switches SWA and SWB being driven in phase opposition $I_A$ and $I_B$ at a second switching frequency (for example, the frequency of the first semiperiod of $I_B$ in FIG. 2), essentially higher than the first frequency, respectively during a semiperiod of closure of the third switch SWC as shown in FIG. 3 and during a semiperiod of closure of the fourth switch SWD as shown in FIG. 4.

As will be recognized by those skilled in the art, the innovative concepts described in the present application can be modified and varied over a tremendous range of applications, and accordingly the scope of patented subject matter is not limited by any of the specific exemplary teachings given. For example, as will be obvious to those of ordinary skill in the art, other circuit elements can be added to, or substituted into, the specific circuit topologies shown.

The presently preferred embodiment has been implemented with bipolar devices, for use in the very low supply voltage environment of wristwatches (where the supply voltage, provided by a battery, is typically as low as about 1.5 V, and may be lower due to the temperature dependence and lifetime limits of the battery). However, the invention could alternatively be implemented with FETs or IGBTs as the switching transistors, although this is less preferable.

For another example, the preferred implementation uses the BCD (bipolar/CMOS/DMOS) process, but could alternatively be implemented with discrete devices.

For another example, the polarity reversals in the circuit of FIG. 1 are preferably controlled in such a way as to provide a duration of positive or negative pumping which is load-dependent; but alternatively predetermined durations can be used instead.

For another example, some of the advantages of the disclosed innovation can also be obtained from an alternate embodiment, in which separate voltage outputs are taken from diodes D1 and D2 respectively. (Each output would then preferably have its own output capacitor.) This embodiment is not needed for the templated application, but provides another way to use the novel capabilities of the innovative circuit. However, this alternative embodiment would lose the preferred embodiment's advantage that the total voltage across the load can be twice the limit imposed by the breakdown voltage of the semiconductor components.

What is claimed is:

1. A two-way boost converter circuit for driving a capacitive load, for operation from first and second power supply connections, comprising:
   an inductor connected between said first and second power supply connections to pass current in a first direction;
   a first switch connected in series between said inductor and said first power supply connection, said first switch receiving a high frequency signal during a first phase to negatively charge said capacitive load;
   a second switch connected in series between said inductor and said second power supply connection, said second switch receiving a high frequency signal during a second phase to positively charge said capacitive load;
   a third switch connected to a first terminal of said inductor, and a fourth switch connected to a second terminal of said inductor; and
   a first diode connected in series with said third switch between an output terminal and said first terminal of said inductor, and a second diode connected in series with said fourth switch between said output terminal and said second terminal of said inductor, wherein said first and second diodes are connected to said output terminal with opposite respective orientations.

2. The circuit of claim 1, wherein said first and second switches comprise transistors of opposite conductivity types.

3. The circuit of claim 1, wherein said switches comprise bipolar transistors.

4. The circuit of claim 1 h wherein said capacitive load includes an electroluminescent display connected to said output terminal.

5. The circuit of claim 1, wherein said first power supply connection receives a positive voltage, and said second power supply connection provides a chip ground for said first and second switches.

6. A two-way boost converter circuit, for operation from first and second power supply connections, comprising:
   an inductor;
   a first switching circuit having an input receiving a high frequency signal during a first phase, the first switching circuit operatively connected to source current from said first power supply connection to a first terminal of said inductor;
   a second switching circuit having an input receiving a high frequency signal during a second phase, the second switching circuit operatively connected to sink current from a second terminal of said inductor to said second power supply connection;
   a third switching circuit operatively connected to source current from an output terminal to said first terminal of said inductor such that said first switching circuit negatively pumps the voltage at said output terminal responsive to said high frequency signal during said first phase; and
   a fourth switching circuit operatively connected to sink current from said second terminal of said inductor to said output terminal such that said second switching circuit positively pumps the voltage at said output terminal responsive to said high frequency signal during said second phase.

7. The circuit of claim 6, wherein said first and second switching circuits are interconnected so that during one of said first and second phases one of said first and second switching circuits turns on intermittently responsive to said high frequency signal while the other of said first and second switching circuits turns on constantly, and vice-versa.

8. The circuit of claim 6, wherein said third and fourth switching circuits each comprise a transistor in series with a diode, and said diodes of said third and fourth switching circuits are antiparallel with respect to said output terminal, and said transistors of said third and fourth switching circuits are of opposite conductivity types.

9. The circuit of claim 6, wherein said third and fourth switching circuits are interconnected to never both turn on at the same time.

10. The circuit of claim 6, wherein said first and second switching circuits comprise transistors of opposite conductivity types.

11. The circuit of claim 6, wherein said switching circuits each comprise a bipolar transistor.

12. The circuit of claim 6, further comprising an output capacitor connected to said output terminal.

13. The circuit of claim 6, wherein said first power supply connection receives a positive voltage, and said second power supply connection provides a chip ground for said first through fourth switching circuits.

14. A two-way boost converter circuit for driving a capacitive load, for operation from first and second power supply connections, comprising:
   first and second terminals for connection to an external inductor;
   a first switch connected in series between said first terminal and said first power supply connection, said first switch receiving a high frequency signal during a first phase to negatively charge said capacitive load;
   a second switch connected in series between said second terminal and said second power supply connection, said second switch receiving a high frequency signal during a second phase to positively charge said capacitive load;
   a third switch connected to said first terminal and a fourth switch connected to said second terminal; and
   a first diode connected in series with said third switch between an output terminal and said first terminal, and a second diode connected in series with said fourth switch between said output terminal and said second terminal; wherein said first and second diodes are connected to said output terminal with opposite respective orientations.

15. The circuit of claim 14, wherein said first and second switches comprise transistors of opposite conductivity types.

16. The circuit of claim 14, wherein said switches comprise bipolar transistors.

17. The circuit of claim 14, wherein said capacitive load includes an electroluminescent display connected to said output terminal.

18. The circuit of claim 14, wherein said first power supply connection receives a positive voltage and said second power supply connection provides a chip ground for said first through fourth switching circuits.

19. An integrated two-way boost converter circuit, for operation from first and second power supply connections, comprising:

first and second terminals for connection to an external inductor;

a first switching circuit having an input receiving a high frequency signal during a first phase, the first switching circuit operatively connected to source current from said first power supply connection to said first terminal;

a second switching circuit having an input receiving a high frequency signal during a second phase, the second switching circuit operatively connected to sink current from said second terminal to said second power supply connection;

a third switching circuit operatively connected to source current from an output terminal to said first terminal such that said first switching circuit negatively pumps the voltage at said output terminal responsive to said high frequency signal during said first phase; and a fourth switching circuit operatively connected to sink current from said second terminal to said output terminal such that said second switching circuit positively pumps the voltage at said output terminal responsive to said high frequency signal during said second phase.

20. The integrated circuit of claim 19, wherein said first and second switching circuits are interconnected so that during one of said first and second phases one of said first and second switching circuits turns on intermittently responsive to said high frequency signal while the other of said first and second switching circuits turns on constantly, and vice-versa.

21. The integrated circuit of claim 19, wherein said third and fourth switching circuits each comprise a transistor in series with a diode, and said diodes of said third and fourth switching circuits are antiparallel with respect to said output terminal, and said transistors of said third and fourth switching circuits are of opposite conductivity types.

22. The integrated circuit of claim 19 wherein said third and fourth switching circuits are interconnected to never both turn on at the same time.

23. The integrated circuit of claim 19, wherein said first and second switching circuits comprise transistors of opposite conductivity types.

24. The integrated circuit of claim 19, wherein said switching circuits each comprise a bipolar transistor.

25. The integrated circuit of claim 19, further comprising an output capacitor connected to said output terminal.

26. The integrated circuit of claim 19, wherein said first power supply connection receives a positive voltage, and said second power supply connection provides a chip ground for said first through fourth switching circuits.

27. A method for driving a capacitive load, comprising the steps of:

a) driving current through an inductor in a first direction, the inductor having first and second terminals;

b) chopping current to said inductor;

c) connecting said first terminal of said inductor to said capacitive load to negatively charge said capacitive load;

d) repeating steps a) to c) to progressively charge said capacitive load to a first voltage;

e) driving current through said inductor in said first direction;

f) chopping current to said inductor;

g) connecting said second terminal of said inductor to said capacitive load to positively charge said capacitive load; and h) repeating steps e) to g) to progressively charge said capacitive load to a second voltage.

28. The method of claim 27, while step c) is being performed, further comprising the step of disconnecting said second terminal of said inductor from said capacitive load.

29. The method of claim 27, while steps b) and c) are being performed, further comprising the step of preventing current flow from said first terminal of said inductor to said capacitive load.

30. A boost converter for driving an output node connected to a terminal of a capacitive load having a second terminal connected to ground, the boost converter comprising:

a first switch connected between a first terminal of the inductor and a supply rail;

a second switch connected between a second terminal of the inductor and ground;

a first discharge path between said first terminal of the inductor and said output node, and including a first diode and a third switch connected in series with each other;

a second discharge path between said second terminal of the inductor and said output node, and including a second diode and a fourth switch connected in series with each other;

said third and fourth switches being driven in phase opposition at a first control frequency and said first and second switches being driven in phase opposition at a second switching frequency substantially higher than said first frequency during a first semiperiod of closure of said third switch and during a second semiperiod of closure of said fourth switch.

31. A boost converter as defined in claim 30, characterized by the fact that said capacitive load is an electroluminescent diode.

32. A boost converter according to claim 30, wherein said first control frequency is comprised between 20 and 100 Hz and said second switching frequency is higher than 1 kHz.

33. A boost converter according to claim 30, wherein said switches are bipolar transistors.

34. A boost converter according to claim 30, wherein said switches are field effect transistors.

* * * * *